(12) United States Patent
Colombi et al.

(10) Patent No.: US 11,841,755 B2
(45) Date of Patent: Dec. 12, 2023

(54) POWER SUPPLY DEVICE FOR POWERING A POWER LINE

(71) Applicant: ABB Schweiz AG, Baden (CH)

(72) Inventors: Silvio Colombi, Losone (CH); Jos Van Der Lee, Ouderkerk aan de Amstel (NL); Nicola Notari, Gentilino (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/365,482

(22) Filed: Jul. 1, 2021

(65) Prior Publication Data

US 2022/0004242 A1 Jan. 6, 2022

(30) Foreign Application Priority Data

Jul. 3, 2020 (EP) ..................... 20184008

(51) Int. Cl.
*G06F 1/3206* (2019.01)
*G06F 1/12* (2006.01)
*H02J 3/18* (2006.01)

(52) U.S. Cl.
CPC .............. *G06F 1/3206* (2013.01); *G06F 1/12* (2013.01); *H02J 3/1878* (2013.01)

(58) Field of Classification Search
CPC ........ G06F 1/3206; G06F 1/12; H02J 3/1878; H02J 3/34; H02J 9/062; H02J 13/00002; H02J 13/00006; B60M 3/00
See application file for complete search history.

(56) References Cited

U.S. PATENT DOCUMENTS 10,686,369 B1 * 6/2020 Motoyama ................ H02J 3/06
2003/0039132 A1 2/2003 Engler
(Continued)

FOREIGN PATENT DOCUMENTS

CN 1581631 A 2/2005
CN 106953332 A * 7/2017
(Continued)

OTHER PUBLICATIONS

GPS Disciplined Oscillator (Year: 2021).*
(Continued)

*Primary Examiner* — Kim Huynh
*Assistant Examiner* — Cory A. Latham
(74) *Attorney, Agent, or Firm* — Leydig, Voit & Mayer, Ltd.

(57) ABSTRACT

A power supply for a power line includes a synchronization module having a receiver configured for receiving a clock signal from a satellite-based positioning system and an oscillator configured for generating a periodic signal synchronized to the received clock signal. The power supply includes an inverter module having an inverter configured for supplying an AC voltage to the power line, receiving the periodic signal from the synchronization module, and controlling the inverter using the received periodic signal as a synchronization reference signal for the supplied AC voltage. The power supply further includes a power exchange control module configured for: monitoring an active power flow P from the inverter module to the power line, determining whether the active power flow P satisfies a reverse-flow condition, and when the reverse-flow condition is determined, adapting at least one of a phase and an output voltage of the supplied AC voltage.

19 Claims, 2 Drawing Sheets

(56) References Cited

U.S. PATENT DOCUMENTS

2012/0267952 A1* 10/2012 Ballatine ................. H02J 1/102
307/26
2014/0152087 A1 6/2014 Nakatsuka et al.

FOREIGN PATENT DOCUMENTS

| CN | 106953332 A | 7/2017 | | |
|---|---|---|---|---|
| CN | 109193810 A | 1/2019 | | |
| CN | 109428391 A | 3/2019 | | |
| DE | 10006844 B3 | 2/2004 | | |
| WO | WO 2020/030671 A1 | 2/2020 | | |
| WO | WO-2020030671 A1 * | 2/2020 | .............. | H02J 3/381 |

OTHER PUBLICATIONS

European Patent Office, Extended European Search Report in European Patent Application No. 20184008.9, 6 pp. (dated Dec. 9, 2020).

\* cited by examiner

POWER SUPPLY DEVICE FOR POWERING A POWER LINE

CROSS-REFERENCE TO RELATED APPLICATIONS

This patent application claims the benefit of European Patent Application No. 20184008.9, filed Jul. 3, 2020, which is fully incorporated herein by reference.

FIELD OF THE DISCLOSURE

The present disclosure relates to a power supply device for powering a power line, particularly a railway power line. Embodiments relate to a power supply system including a power supply device, and to a method of powering a power line

TECHNICAL BACKGROUND

In various applications, AC power may be supplied to a powerline and thereby to a load at least temporarily by two or more power supply devices simultaneously. In this case, proper operation requires the load to be shared to an acceptable level, which requires the amplitude and phase of the different voltages to be adapted for this purpose. Moreover, it can be useful or even necessary to control an exchange of active and reactive power between the power supply devices. Traditionally, the synchronization and the control of load sharing require direct communication between the power supply devices. This is typically enabled by a communication line. However, if the power supply devices are separated by a long distance, providing a communication line constitutes a substantial additional effort. For example, in railway applications, a distance between two power supply devices may be in the order of 20 to 30 km.

It is therefore an object of the present disclosure to overcome at least some of the above-mentioned problems in the prior art at least partially.

SUMMARY OF THE DISCLOSURE

In view of the above, a power supply device for powering a power line is provided. The power supply device includes a synchronization module having a receiver configured for receiving a clock signal from a satellite-based positioning system and an oscillator configured for generating a periodic signal synchronized to the received clock signal. The power supply device further includes an inverter module having an inverter configured for supplying an AC voltage to the power line, the inverter module being configured for receiving the periodic signal from the synchronization module and for controlling the inverter using the received periodic signal as a synchronization reference signal for the supplied AC voltage. The power supply device further includes a power exchange control module configured for: monitoring an active power flow P from the inverter module to the power line, determining whether the active power flow P satisfies a reverse-flow condition, and in case the reverse-flow condition is determined, adapting at least one of a phase and an output voltage of the supplied AC voltage.

In embodiments, a power supply system is provided. The power supply system includes a power supply device according embodiments of the present disclosure and a power line. The power supply device is connected to the power line for powering the power line.

According to an aspect of the present disclosure, a method of powering a power line is provided. The method includes receiving a clock signal from a satellite-based positioning system, generating a periodic signal synchronized to the received clock signal, supplying an AC voltage via an inverter of an inverter module to a powerline, and using the periodic signal as a synchronization reference signal for the supplied AC voltage. The method further includes monitoring an active power flow P from the inverter module to the power line, determining whether the active power flow P satisfies a reverse-flow condition, and in case the reverse-flow condition is determined, adapting at least one of a phase and an output voltage of the supplied AC voltage.

Further advantages, features, aspects and details that can be combined with embodiments described herein are evident from the dependent claims, claim combinations, the description and the drawings.

BRIEF DESCRIPTION OF THE FIGURES

The details will be described in the following with reference to the figures, wherein.

DETAILED DESCRIPTION OF THE FIGURES AND OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can be applied to a corresponding part or aspect in another embodiment as well.

Figure 1:
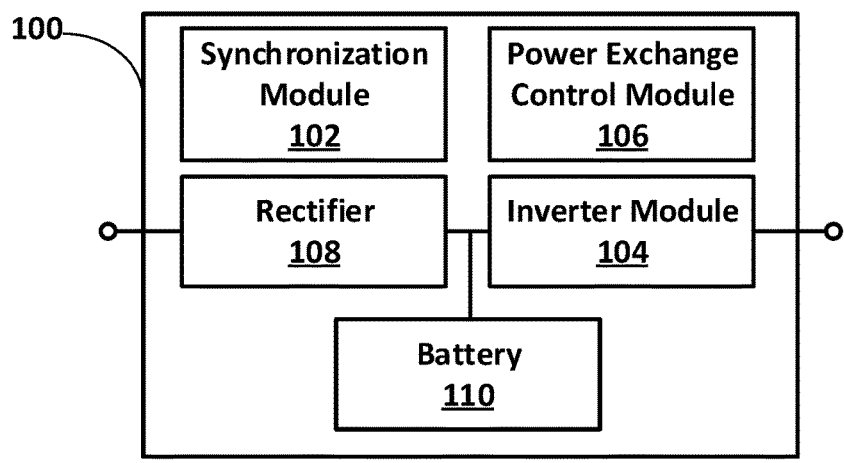
FIG. 1 is a schematic view of a power supply device according to embodiments of the present disclosure.

FIG. 1 is a schematic view of a power supply device for powering a power line, according to embodiments of the present disclosure. The power supply device may be for a railway application, particularly for a railway electrification system. More particularly, the power supply device can be a power supply device for powering a railway power line. In the embodiment shown in FIG. 1, the power supply device is an uninterruptable power supply including a rectifier 108 and a power source such as a battery 110.

The power supply device 100 includes a synchronization module 102 having a receiver configured for receiving a clock signal from a satellite-based positioning system. In particular, the receiver includes an antenna. The satellite-based positioning system may be for example the Global Positioning System (GPS) or Galileo.

The synchronization module 102 further includes an oscillator configured for generating a periodic signal synchronized to the received clock signal. In embodiments, the oscillator is a disciplined oscillator. The oscillator may be for example a quartz or a rubidium oscillator. The periodic signal may be a sinusoidal signal, particularly a sinusoidal voltage. The periodic signal may have a frequency being the AC frequency of the power line, for example 50 or 60 Hz, or another frequency used e.g. for railway applications. In embodiments, the synchronization module uses a GPS pulse-per-second signal to generate the periodic signal. The oscillator may be configured for providing the frequency of the periodic signal based on the received clock signal. The oscillator may be configured for synchronizing the phase of the periodic signal to the received clock signal. Thus, a particularly accurate and phase-controlled periodic signal may be provided.

The synchronization module may exchange additional information with further components of the power supply device to ensure reliable operation even in degraded conditions. For example, information regarding the state of synchronization may be transmitted to further components of the power supply device.

The power supply device 100 includes an inverter module 104 having an inverter configured for supplying an AC voltage to the power line. The inverter module is configured for receiving the periodic signal from the synchronization module 102 and for controlling the inverter using the received periodic signal as a synchronization reference signal for the supplied AC voltage.

A synchronization based on a clock signal of a satellite-based positioning system has the advantage that two or more power supply devices may synchronized without the need for direct communication. In particular, communication lines between the power supply devices may be omitted. This is particularly beneficial for setups with large distances between the power supply devices. In railway applications, a distance between two power supply devices may be larger than for example 5, 10, or 25 km and may be up to 100 km or even more.

The power supply device 100 further includes a power exchange control module 106. The power exchange control module 106 is configured for monitoring an active power flow P from the inverter module 104 to the power line.

The power exchange control module is further configured for determining whether the active power flow P satisfies a reverse-flow condition and in case the reverse-flow condition is determined, adapting at least one of a phase and an output voltage of the supplied AC voltage.

Adapting at least one of a phase and an output voltage of the supplied AC voltage when a reverse-flow condition is determined has the advantage that a reverse flow of active power may be reduced or eliminated. In the context of the present disclosure, the reverse-flow condition being satisfied is particularly to be understood as the active power flow P from the inverter module to the power line being negative (i.e., active power flowing from the power line to the inverter module).

The power exchange control module 106 is further configured to change an output voltage of the supplied AC voltage depending on a value of the active power flow P. Changing the output voltage of the supplied AC voltage depending on a value of the active power flow has the advantage that an exchange of active power between two or more power supply devices may be controlled. This is explained in more detail further below, with regard to FIGS. 2-3. The power exchange control module may be configured to set the output voltage according to a function of the active power flow P, wherein the function is monotonically decreasing.

In embodiments, the power exchange control module is configured to set the output voltage according to a first linear function of the active power flow P for positive values of the active power flow P and according to a second linear function for negative values of the active power flow P. A slope of the second linear function may be larger than a slope of the first linear function.

In embodiments, the power supply device is configured to selectively switch off, depending on a reception status of the clock signal and on a value of the active power exchanged between the power supply device and the power line. The power supply device may be configured to selectively switch off when: a time span since a last successful reception of the clock signal exceeds a predetermined value, or when reception of the clock signal fails and an active power received from the power line exceeds a predetermined threshold.

Figure 2:
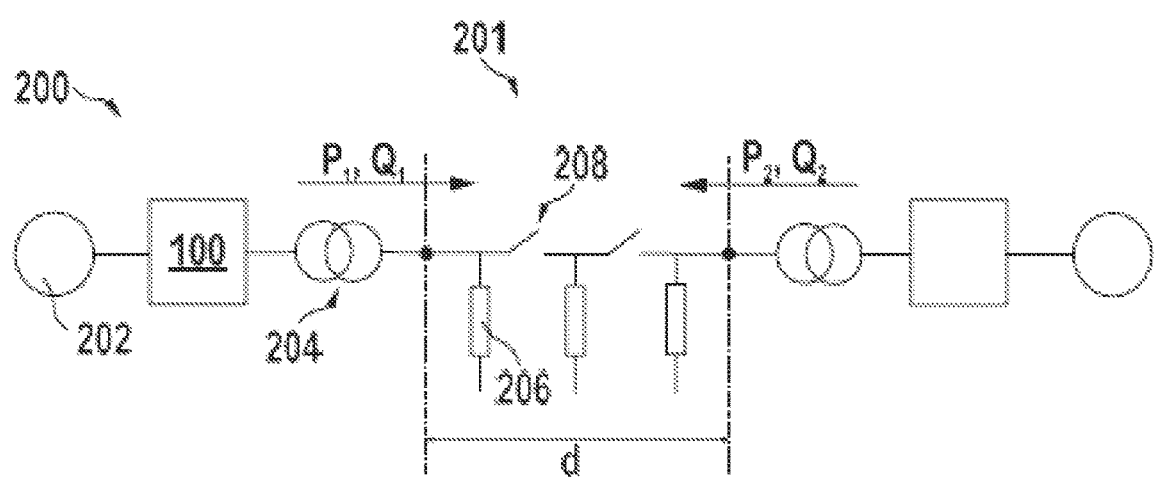
FIG. 2 is a schematic view of a power supply system according to embodiments of the present disclosure.

FIG. 2 is a schematic view of a power supply system according to embodiments of the present disclosure. The power supply system 200 includes a power supply device 202 according to embodiments of the present disclosure and a power line 201. The power supply device 202 is connected to the power line 201 for powering the power line.

In embodiments, the power supply system 200 includes a transformer 204, particularly a step-up transformer. The power line may be operated at a single phase voltage. A voltage of the AC voltage supplied to the power line may be larger than for example 1, 1.5 or 2 kV. The voltage of the supplied AC voltage may be smaller than 30, 20, or 10 kV.

According to an aspect of the present disclosure, the power supply device 202 of the power supply system 200 may be a first power supply device. The power supply system 200 shown in FIG. 2 includes a second power supply device. Generally, a power supply system according to the present disclosure may include at least one second power supply device. The at least one second power supply device may correspond in structure and function at least substantially to the first power supply device. In at least one operating state of the power supply system, the first power supply device and the at least one second power supply device may be connected to the power line for powering the power line.

In embodiments, the power supply system 200 includes at least one load 206 positioned along the power line 201. The power supply system may include at least one switch 208 positioned along the power line 201. When the switch is operated, an electrical connection between the first power supply device and the second power supply device is interrupted.

In embodiments, a distance between the first power supply device and the at least one second power supply device is larger than for example 5, 10, or 20 km. The distance between the first power supply device and the at least one second power supply device may be smaller than for example 100 or 60, 45, or 30 km.

In embodiments, the power supply system is devoid of any communication links between the first power supply device and the at least one second power supply device. A power supply system associated with reduced installation requirements may be provided.

Load Sharing

As represented in FIG. 2, the first power supply device 202 of a power supply system of the present disclosure may deliver an active Power $P_1$ and a reactive power $Q_1$. The at least one second power supply device may deliver an active power $P_2$ and a reactive power $Q_2$. Perfect load sharing between the first and the at least one second power supply device would be defined by:

$$\begin{cases} P_1 = P_2 = P/2 \\ Q_1 = Q_2 = Q/2 \end{cases} \quad (1)$$

In particular, P and Q are respectively the total active power and the total reactive power consumed, particularly by a load, more particularly by the at least one load 206. Generally, when no active load sharing control is implemented, active and reactive power are not going to be shared equally among the power supply devices. Therefore, the power supply devices may exchange active and/or reactive power.

Load sharing between the first power supply device and the at least one second power supply device is affected by different factors. As an example, each of the power supply devices can be considered to constitute a single-phase voltage source. The voltage of the supplied AC voltage may be for example 2, 3 or 5 kV. Load sharing particularly will depend on a phase difference $\Delta\varphi$ and an amplitude difference $\Delta V$ between the voltage sources. More particularly, load sharing will further depend on an impedance difference $\Delta Z$ seen by the voltage sources.

Circulating Currents and Droop Control

Figure 3:
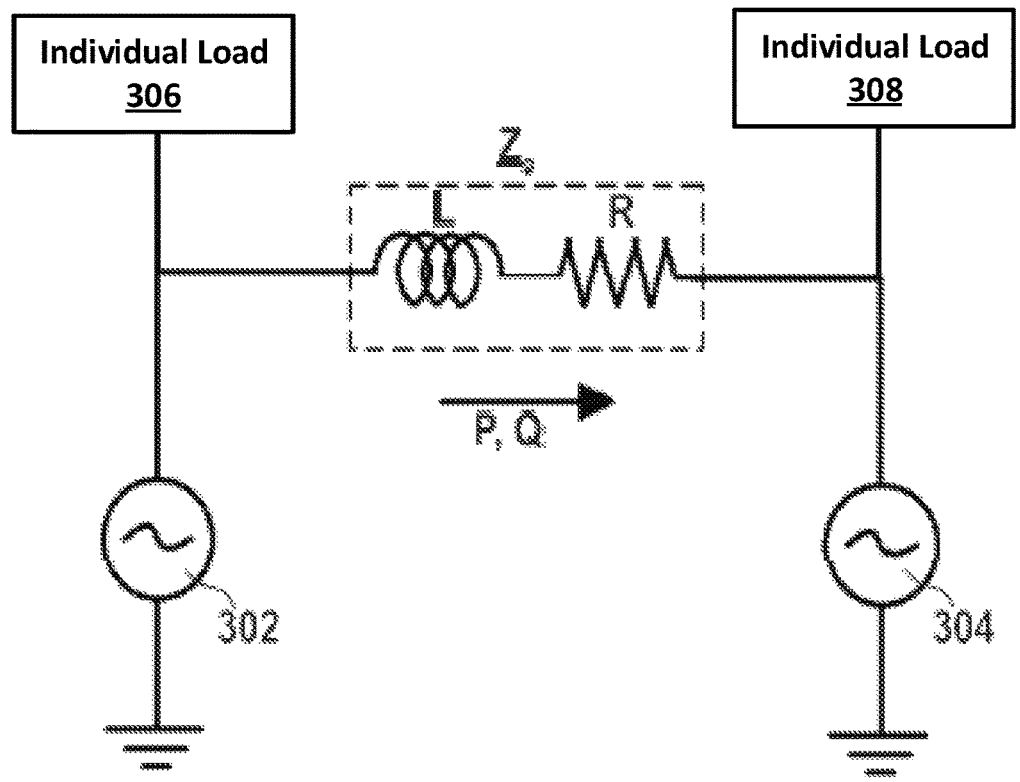
FIG. 3 is a schematic view of a power supply system according to embodiments of the present disclosure.

FIG. 3 illustrates a power supply system according to embodiments of the present disclosure. A first power supply device and a second power supply device are illustrated as a first voltage source 302 and a second voltage source 304, respectively. In particular, the first and the second voltage source are associated with a voltage $\hat{V}_1 \sin(\omega t+\varphi_1)$ and a voltage $\hat{V}_2 \sin(\omega t+\varphi_2)$, respectively. More particularly, $\varphi_1$ and $\varphi_2$ are the respective phases of the first and the second voltage source and $\omega$ is a nominal angular frequency.

The first and the second voltage source may be connected via a line having an impedance $\underline{Z}_g$. An individual load 306 may be connected to the first voltage source 302. An individual load 308 may be connected to the second voltage source 304.

The active power P and the reactive power Q flowing between the voltage sources are given by:

$$P = \left[ \frac{V_1 V_2}{Z_g} \cos(\varphi_1 - \varphi_2) - \frac{V_2^2}{Z_g} \right] \cos(\theta_g) + \frac{V_1 V_2}{Z_g} \sin(\varphi_1 - \varphi_2) \sin(\theta_g) \quad (2)$$

$$Q = \left[ \frac{V_1 V_2}{Z_g} \cos(\varphi_1 - \varphi_2) - \frac{V_2^2}{Z_g} \right] \sin(\theta_g) - \frac{V_1 V_2}{Z_g} \sin(\varphi_1 - \varphi_2) \cos(\theta_g) \quad (3)$$

$$\underline{Z}_g = Z_g e^{j\theta_g} = R + j\omega L = R + jX \quad (4)$$

wherein $\theta_g$, R, L, and X are respectively: the angle, the resistance, the inductance, and the reactance at the nominal angular frequency $\omega$. $V_1$ and $V_2$ are the RMS values of the respective voltages of the first and second voltage source.

Equations (2)-(4) show that the exchange of active and reactive power depends on the amplitudes and the phases of the two voltage sources as well as on the nature of the impedance between the voltage sources.

For a purely inductive connecting impedance ($\theta_g=\pi/2$), equations (2) and (3) become:

$$P = \frac{V_1 V_2}{Z_g} \sin(\varphi_1 - \varphi_2) \quad (5)$$

$$Q = \frac{V_1 V_2}{Z_g} \cos(\varphi_1 - \varphi_2) - \frac{V_2^2}{Z_g} \quad (6)$$

For a purely resistive connecting impedance ($\theta_g=0$), equations (2) and (3) become:

$$P = \frac{V_1 V_2}{Z_g} \cos(\varphi_1 - \varphi_2) - \frac{V_2^2}{Z_g} \quad (7)$$

$$Q = -\frac{V_1 V_2}{Z_g} \sin(\varphi_1 - \varphi_2) \quad (8)$$

Considering small variations around an equilibrium point, variations $\Delta P$ of the active power and variations $\Delta Q$ of the reactive power may be modelled by the following equations:

$$\Delta P = k_{p\varphi}\Delta\varphi + k_{pV}\Delta V \quad (9)$$

$$\Delta Q = k_{q\varphi}\Delta\varphi + k_{qV}\Delta V \quad (10)$$

The values of the factors $k_{p\varphi}, k_{pV}, k_{q\varphi}$ and $k_{qV}$ in equations (9) and (10) depend on the nature of the line connecting the voltage sources. For mainly resistive lines ($R \gg X \rightarrow \theta_g \approx 0$), the factors $k_{p\varphi}$ and $k_{qV}$ are very small and equations (9) and (10) can be approximated by $$\Delta P \approx k_{pV}\Delta V \quad (11)$$

$$\Delta Q \approx k_{q\varphi}\Delta\varphi \quad (12)$$

In case of a mainly resistive line, droop controls that may be implemented for controlling the flow of active and reactive power are: voltage versus active power and frequency versus reactive power. In particular, the variation of frequency can be used to generate a phase shift variation between the two voltage sources, since the phase angle is the integral of the angular frequency ($\varphi=\int\omega$).

In case of mainly inductive lines ($R \ll X \rightarrow \theta_g \approx \pi/2$) the factors $k_{pV}$ and $k_{q\varphi}$ are very small and equations (9) and (10) can be approximated by:

$$\Delta P = k_{p\varphi}\Delta\varphi \quad (13)$$

$$\Delta Q = k_{qV}\Delta V \quad (14)$$

For a mainly inductive line, droop controls that may be implemented for controlling the flow of active and reactive power are: frequency versus active power and voltage versus reactive power. As for the case of a mainly resistive line described above, the variation of frequency can be used to generate a phase shift variation between the two voltage sources.

The ratio R/X of a power line depends on the nominal voltage, i.e. on whether it is a low-voltage (LV), a medium-voltage (MV) or a high-voltage (HV) line. The higher the voltage, the more inductive the behavior of the power line. Typically, the following holds for the ratios:

$$\left(\frac{R}{X}\right)_{LV} \gg 1, \left(\frac{R}{X}\right)_{MV} \approx 1 \text{ and } \left(\frac{R}{X}\right)_{HV} \ll 1.$$

An R/X ratio for an LV line may be for example 6, 7, or 8. An R/X ratio for an MV line may be for example 0.9, 1.0 or 1.1. An R/X ratio for an HV line may be for example 0.2, 0.3, or 0.4.

Power supply systems according to the present disclosure may include at least one switch, as described with regard to FIG. 2. With the switch, an electrical connection between power supply devices of the power supply system may be interrupted. In particular, operation of the switch can occur without information about the operation being transferred to the power supply devices. More particularly, the at least one switch can be operated without the operation being under control of the power supply devices.

Using a droop control that modifies the frequency in such a system is associated with the risk that two power supply devices could be reconnected while operating at differing frequencies, i.e. with their phase difference sliding. It could occur that two voltage sources having a large phase shift are operated in parallel, for example even being in phase opposition. This would result in a very large circulating current. Protections could be triggered, leading to a disconnection of the power supply device.

As mentioned with regard to FIG. 1, power supply devices according to the present disclosure may be configured to set an output voltage according to a function of the active power flow. In embodiments, the power supply device may implement a droop control based on equation (11) above.

Figure 4:
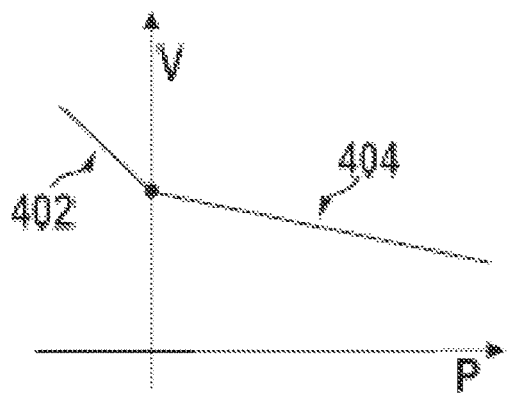
FIG. 4 shows a graph illustrating a modified voltage droop control, according to aspects of the present disclosure.

FIG. 4 shows a graph illustrating a modified voltage droop control. In particular, an output voltage V to be set by a power supply device depending on values of an active power flow P is depicted. As can be seen, the output voltage V is to be set according to a first linear function 404 of the active power flow P for positive values of the active power flow P. The output voltage V is to be set according to a second linear function 402 for negative values of the active power flow P. A slope of the second linear function is larger than a slope of the first linear function. A power supply device having a particularly strong reaction to a reverse flow of active power may be provided.

Phase Modification

As mentioned with regard to FIG. 1, power control devices according to the present disclosure may react to a reverse flow of active power by adapting a phase of the supplied AC voltage.

A phase-modification based reaction to the reverse flow may be derived from equation (9) above, particularly the term $k_{p\varphi}\Delta\varphi$. In particular, the phase of the supplied AC voltage is to be adapted directly, more particularly not through a frequency droop.

In embodiments, a power supply device of the present disclosure may be configured to modify the phase angle of the supplied AC voltage, in case of a reverse flow of active power, according to $$\varphi_{cor} = k_{\varphi I} \int P dt + k_{\varphi P} P \tag{15}$$

$$\varphi_{new} = \varphi - \varphi_{cor} \tag{16}$$

The power supply device may include for example a PI controller configured to implement a phase angle modification as described above.

As an example of how power supply devices performing phase angle modification may cancel circulation of active power, the system shown in FIG. 3 may be considered. The following exemplary assumptions will be made: no individual loads 306, 308 are connected, the impedance of the connection is purely inductive, and the first voltage source 302 is leading, i.e. $\varphi_1$ in equation (2) above is greater than $\varphi_2$. According to equation (2), the active power of the first voltage source is positive and the active power of the second voltage source is negative. Accordingly, the first voltage source is pushing power into the second voltage source.

Since the active power flow with regard to the second voltage source is negative, a negative phase correction angle $\varphi_{cor}$ will be determined for the second voltage source, particularly according to equation (15). Accordingly, the phase angle $\varphi_2$ of the second voltage source will be increased, particularly according to equation (16), until it reaches the value of the first voltage source's phase angle $\varphi_1$. A circulation of active power can therefore be canceled.

Combination of Voltage Droop and Phase Modification

Power supply devices according to the present disclosure may implement variations of both the voltage droop technique and of the phase modification technique as described in the present disclosure.

The techniques may be implemented for example by an algorithm. The algorithm may employ a sampling time $T_E$ larger than for example 20, 50, or 75 μs. The sampling time $T_E$ may be smaller than for example 250, 200, or 150 μs. The sampling time may be for example 80, 100 or 120 μs.

An instantaneous active power may be determined by:

$$P(k) = V_1(k)I_1(k) + V_2(k)I_2(k) + V_3(k)I_3(k) \tag{17}$$

wherein $V_1$, $V_2$ and $V_3$ are the output phase to neutral voltages of the power supply device. $I_1$, $I_2$ and $I_3$ are the output currents.

A moving average over one period T may be applied to the samples of the active power:

$$P(k) \rightarrow [\text{moving average over } T] \rightarrow P_{av}(k) \tag{18}$$

The period T particularly depends on the nominal frequency of the supplied AC voltage. For example, the period T may be 1 s/50 or 1 s/60.

A voltage droop may be applied to $P_{av}(k)$:

$$V[k] = V_n - K_{Pdroop} P_{av}[k] \tag{19}$$

For an active power of P=0, the nominal voltage is set for the supplied AC voltage.

In embodiments, different factors $K_{Pdroop}$ may be used, so as to react to a positive and to a negative flow of the active power differently:

$$K_{Pdroop} = \begin{cases} K_{PdroopP}\left[\dfrac{\text{Hz}}{\text{kW}}\right]; & \text{for } P_{av} > 0 \\ K_{PdroopN}\left[\dfrac{\text{Hz}}{\text{kW}}\right]; & \text{for } P_{av} < 0 \end{cases} \tag{20}$$

In embodiments, the phase modification technique is implemented digitally. The phase modification technique may be implemented via a PI controller. The phase modification technique may be implemented according to the following instructions:

if $(P_{av}[k]<0)$ then $$\varphi_{cor}[k] = X_R[k] + K_{PI} P_{av}[k] \tag{21}$$

$$X_R[k+1] = X_R[k] + K_I P_{av}[k]$$

else $\{P_{av}[k] \geq 0\}$ $\varphi_{cor}[k] = X_R[k]$

The internal electrical angle may be updated according to the equation:

$$\vartheta(k+1) = \vartheta(k) + 2\pi f_n T_E \qquad (22),$$

wherein $f_n$ is the nominal frequency. In particular, the nominal frequency is constant.

Reference voltages for the three voltages may be updated according to:

$$V_{1ref}(k) = V(k)\sin(\vartheta(k) - \varphi_{cor}[k]) \qquad (23)$$

$$V_{2ref}(k) = V(k)\sin(\vartheta(k) - \varphi_{cor}[k] - 2\pi/3) \qquad (24)$$

$$V_{3ref}(k) = V(k)\sin(\vartheta(k) - \varphi_{cor}[k] + 2\pi/3) \qquad (25)$$

The respective phase voltages of the power supply device may follow the reference voltages according to the dynamics of the voltage control algorithms.

Operational Constraints

When a first power supply device of a power supply system according to the present disclosure loses the clock signal of the satellite-based positioning system, the phase of the supplied AC voltage starts to shift. If the power supply device is electrically connected to a second power supply device, a circulation of active power ensues. This problem is dealt with via the modified voltage droop and the phase modification technique as described in the present disclosure. If nonetheless one of the power supply devices receives too much active power, it has to be switched off to prevent damage.

When the first and the second power supply devices are not electrically connected, there is no exchange of active power. However, if at least one of the power supply devices does not receive the clock signal of the satellite-based positioning system, the power supply device has to be switched off at a specific time to prevent damage following a potential sudden electrical reconnection.

In embodiments, if the clock signal of the satellite-based positioning system is lost or an error occurs in the synchronization module, the concerned power supply device is switched off if: the exchanged active power is too high or after a predetermined maximum delay time, whatever occurs first. The maximum delay time depends on the stability of the oscillator of the synchronization module. The stability is key to determine how long a power supply device without a currently received clock signal can be left switched on. Advanced disciplined oscillators have a high stability. In embodiments, the maximum delay time may be larger than for example 1, 5, or 10 days.

Unlike in a conventional parallel system, bypassing may have to be inhibited in a power supply system according to embodiments of the present disclosure.

The present disclosure further relates to a method of powering a power line. In particular, the power line is a railway power line. The method includes: receiving a clock signal from a satellite-based positioning system and generating a periodic signal synchronized to the received clock signal. The method further includes supplying an AC voltage via an inverter of an inverter module to a powerline, using the periodic signal as a synchronization reference signal for the supplied AC voltage.

The method further includes monitoring an active power flow P from the inverter module to the power line. The method further includes determining whether the active power flow P satisfies a reverse-flow condition and in case the reverse-flow condition is determined, adapting at least one of a phase and an output voltage of the supplied AC voltage.

According to an aspect of the present disclosure, the method further may include: setting the output voltage of the supplied AC voltage according to a function of the active power flow P, wherein the function is monotonically decreasing.

The present disclosure can additionally be summarized by the following statements:

Statement 1. Power supply device for powering a power line, the power supply device comprising:
  a synchronization module having a receiver configured for receiving a clock signal from a satellite-based positioning system and an oscillator configured for generating a periodic signal synchronized to the received clock signal;
  an inverter module having an inverter configured for supplying an AC voltage to the power line, the inverter module being configured for receiving the periodic signal from the synchronization module and for controlling the inverter using the received periodic signal as a synchronization reference signal for the supplied AC voltage; and
  a power exchange control module configured for:
    monitoring an active power flow P from the inverter module to the power line,
    determining whether the active power flow P satisfies a reverse-flow condition, and
    in case the reverse-flow condition is determined, adapting at least one of a phase and an output voltage of the supplied AC voltage.

Statement 2. Power supply device according to statement 1, the power supply device being a power supply device for powering a railway power line.

Statement 3. Power supply device according to any of the preceding statements, wherein the power exchange control module is further configured to set the output voltage according to a function of the active power flow P, wherein the function is continuous and preferably monotonically decreasing.

Statement 4. Power supply device according to any of the preceding statements, wherein the power exchange control module is further configured to set the output voltage according to a first linear function of the active power flow P for positive values of the active power flow P and according to a second linear function for negative values of the active power flow P, wherein a slope of the second linear function is larger than a slope of the first linear function.

Statement 5. Power supply device according to any of the preceding statements, the power supply device being configured to selectively switch off, depending on a reception status of the clock signal and on a value of the active power exchanged between the power supply device and the power line.

Statement 6. Power supply device according to statement 5, configured to selectively switch off when:
  a time span since a last successful reception of the clock signal exceeds a predetermined value; or
  reception of the clock signal fails and an active power received from the power line exceeds a predetermined threshold.

Statement 7. Power supply device according to any of the preceding statements, wherein the oscillator is a disciplined oscillator.

Statement 8. Power supply system, including a power supply device according to any of the preceding statements and the power line, the power supply device being connected to the power line for powering the power line.

Statement 9. Power supply system according to statement 8, the power supply device being a first power supply device, the power supply system further including at least one second power supply device according to any of statements 1 to 7, wherein in at least one operating state of the power supply system, the first power supply device and the at least one second power supply device are connected to the power line for powering the power line.

Statement 10. Power supply system according to statement 9, wherein a distance between the first power supply device and the at least one second power supply device is larger than 5 km.

Statement 11. Power supply system according to any of statements 9 to 10, wherein the power supply system is devoid of any communication links between the first power supply device and the at least one second power supply device.

Statement 12. Method of powering a power line, the method including:
  receiving a clock signal from a satellite-based positioning system;
  generating a periodic signal synchronized to the received clock signal;
  supplying an AC voltage via an inverter of an inverter module to a powerline; using the periodic signal as a synchronization reference signal for the supplied AC voltage;
  monitoring an active power flow P from the inverter module to the power line;
  determining whether the active power flow P satisfies a reverse-flow condition; and
  in case the reverse-flow condition is determined, adapting at least one of a phase and an output voltage of the supplied AC voltage.

Statement 13. Method according to statement 12, the power line being a railway power line.

Statement 14. Method according to any of statements 12 to 13, further including: setting the output voltage according to a function of the active power flow P, wherein the function is monotonically decreasing.

The invention claimed is:

1. A power supply device for powering a power line, the power supply device comprising:
  a synchronization module having a receiver configured to receive a clock signal from a satellite-based positioning system and an oscillator configured to generate a periodic signal synchronized to the received clock signal;
  an inverter module having an inverter configured to supply an AC voltage to the power line, the inverter module being configured to receive the periodic signal from the synchronization module and to control the inverter using the received periodic signal as a synchronization reference signal for the supplied AC voltage; and
  wherein the power supply device is configured to:
    monitor an active power flow from the inverter module to the power line,
    determine whether the active power flow satisfies a reverse-flow condition, and
    when the reverse-flow condition is determined, reducing the reverse-flow condition by modifying at least one of a phase and an output voltage of the supplied AC voltage,
    wherein reducing the reverse-flow condition by modifying the phase of the supplied AC voltage is performed using the following equations:

$$\varphi_{cor}=k_{\varphi I}\int Pdt+k_{\varphi P}P, \text{ and}$$

$$\varphi_{new}=\varphi-\varphi_{cor},$$

wherein $k_{\varphi I}$ and $k_{\varphi P}$ represent factors based on an inductive connecting impedance and a resistive connecting impedance of the power line and the power supply device,
    wherein $\varphi_{cor}$ represents a correction that is applied to a current phase $\varphi$ to generate an adapted phase, $\varphi_{new}$, and
    wherein P is a power of the supplied AC voltage,
    wherein reducing the reverse-flow condition by modifying the output voltage of the supplied AC voltage comprises applying a voltage droop to the active power flow using the following formula:

$$V[k]=V_n-K_{Pdroop}P_{av}[k],$$

wherein $V_n$ represents the supplied AC voltage,
    wherein $P_{av}[k]$ is a moving average of the supplied AC voltage over one time period at a time k, and
    wherein V[k] is the adapted output voltage of the supplied AC voltage.

2. The power supply device according to claim 1, the power supply device being a power supply device configured to power a railway power line.

3. The power supply device according to claim 1, wherein the power supply device is further configured to set the output voltage according to a function of the active power flow, wherein the function is continuous and monotonically decreasing.

4. The power supply device according to claim 1, wherein the power supply device is further configured to set the output voltage according to a first linear function of the active power flow for positive values of the active power flow and according to a second linear function for negative values of the active power flow, wherein a slope of the second linear function is larger than a slope of the first linear function.

5. The power supply device according to claim 1, the power supply device configured to selectively switch off, depending on a reception status of the clock signal and on a value of the active power exchanged between the power supply device and the power line.

6. The power supply device according to claim 5, configured to selectively switch off when:
  a time span since a last successful reception of the clock signal exceeds a predetermined value; or
  reception of the clock signal fails and an active power received from the power line exceeds a predetermined threshold.

7. The power supply device according to claim 1, wherein the oscillator is a disciplined oscillator.

8. A power supply system, including a power supply device for powering a power line, the power supply device comprising:
  a synchronization module having a receiver configured to receive a clock signal from a satellite-based positioning system and an oscillator configured to generate a periodic signal synchronized to the received clock signal;
  an inverter module having an inverter configured to supply an AC voltage to the power line, the inverter module configured to receive the periodic signal from the synchronization module and to control the inverter using the received periodic signal as a synchronization reference signal for the supplied AC voltage; and wherein the power supply device is configured to:
monitor an active power flow from the inverter module to the power line,
determine whether the active power flow satisfies a reverse-flow condition, and
when the reverse-flow condition is determined, reducing the reverse-flow condition by modifying at least one of a phase and an output voltage of the supplied AC voltage,
wherein reducing the reverse-flow condition by modifying the phase of the supplied AC voltage is performed using the following equations:

$$\varphi_{cor}=k_{\varphi 1}\int Pdt+k_{\varphi P}P, \text{ and}$$

$$\varphi_{new}=\varphi-\varphi_{cor},$$

wherein $k_{\varphi 1}$ and $k_{\varphi P}$ represent factors based on an inductive connecting impedance and a resistive connecting impedance of the power line and the power supply device,
wherein $\varphi_{cor}$ represents a correction that is applied to a current phase $\varphi$ to generate an adapted phase, $\varphi_{new}$, and
wherein P is a power of the supplied AC voltage; and
wherein reducing the reverse-flow condition by modifying the output voltage of the supplied AC voltage comprises applying a voltage droop to the active power flow using the following formula:

$$V[k]=V_n-K_{Pdroop}P_{av}[k],$$

wherein $V_n$ represents the supplied AC voltage,
wherein $P_{av}[k]$ is a moving average of the supplied AC voltage over one time period at a time k, and
wherein V[k] is the adapted output voltage of the supplied AC voltage, and
the power supply system further including the power line, the power supply device being connected to the power line for powering the power line.

9. The power supply system according to claim 8, the power supply device being a first power supply device, the power supply system further including at least one second power supply device comprising:
a second synchronization module having a second receiver configured to receive the clock signal from the satellite-based positioning system and a second oscillator configured to generate a second periodic signal synchronized to the received clock signal;
a second inverter module having a second inverter configured to supply a second AC voltage to the power line, the second inverter module being configured to receive the second periodic signal from the second synchronization module and to control the second inverter using the received second periodic signal as a second synchronization reference signal for the supplied second AC voltage; and
wherein the second power supply device is configured to:
monitor a second active power flow from the second inverter module to the power line,
determine whether the second active power flow satisfies the reverse-flow condition, and
when the reverse-flow condition is determined, reducing the reverse-flow condition by modifying at least one of a second phase and a second output voltage of the supplied second AC voltage,
wherein reducing the reverse-flow condition by modifying the second phase of the supplied second AC voltage is performed using the following equations:

$$\varphi_{cor2}=k_{\varphi 2}\int P_2dt+k_{\varphi P}P_2; \text{ and}$$

$$\varphi_{new2}=\varphi_2-\varphi_{cor2},$$

wherein $k_{\varphi 2}$ and $k_{\varphi P}$ represent factors based on the inductive connecting impedance and the resistive connecting impedance of the power line and the second power supply device,
wherein $\varphi_{cor2}$ represents a second correction that is applied to a second current phase $\varphi_2$ to generate a second adapted phase, $\varphi_{new2}$, and
wherein $P_2$ is the power of the supplied second AC voltage,
wherein reducing the reverse-flow condition by modifying the second output voltage of the supplied second AC voltage comprises applying a second voltage droop to the second active power flow using the following formula:

$$V_2[k]=V_{n2}-K_{Pdroop2}P_{av2}[k],$$

wherein $V_{n2}$ represents the supplied second AC voltage,
wherein $P_{av2}[k]$ is a moving average of the supplied second AC voltage over one time period at a time k, and
wherein $V_2[k]$ is the adapted second output voltage of the supplied second AC voltage, and
wherein in at least one operating state of the power supply system, the first power supply device and the at least one second power supply device are connected to the power line for powering the power line.

10. The power supply system according to claim 9, wherein a distance between the first power supply device and the at least one second power supply device is larger than 5 km.

11. The power supply system according to claim 9, wherein the power supply system is devoid of any communication links between the first power supply device and the at least one second power supply device.

12. A method of powering a power line, the method including:
receiving a clock signal from a satellite-based positioning system;
generating a periodic signal synchronized to the received clock signal;
supplying an AC voltage via an inverter of an inverter module to a power line; using the periodic signal as a synchronization reference signal for the supplied AC voltage;
monitoring an active power flow from the inverter module to the power line;
determining whether the active power flow satisfies a reverse-flow condition; and
when the reverse-flow condition is determined, reducing the reverse-flow condition by modifying at least one of a phase and an output voltage of the supplied AC voltage,
wherein reducing the reverse-flow condition by modifying the phase of the supplied AC voltage is performed using the following equations:

$$\varphi_{cor}=k_{\varphi 1}\int Pdt+k_{\varphi P}P; \text{ and}$$

$$\varphi_{new}=\varphi-\varphi_{cor},$$

wherein $k_{\varphi 1}$ and $k_{\varphi P}$ represent factors based on a nature of the power line and the power supply device,
wherein $\varphi_{cor}$ represents a correction that is applied to a current phase $\varphi$ to generate an adapted phase, $\varphi_{new}$,
wherein P is a power of the suppled AC voltage, wherein reducing the reverse-flow condition by modifying the output voltage of the supplied AC voltage comprises applying a voltage droop to the active power flow using the following formula:

$V[k]=V_n-K_{Pdroop}P_{av}[k]$, wherein $V_n$ represents the supplied AC voltage,
wherein $P_{av}[k]$ is a moving average of the supplied AC voltage over one time period at a time k, and
wherein $V[k]$ is the adapted output voltage of the supplied AC voltage.

13. The method according to claim 12, the power line being a railway power line.

14. The method according to claim 12, further including: setting the output voltage according to a function of the active power flow P, wherein the function is monotonically decreasing.

15. The power supply device of claim 9, wherein the inverter and the second inverter are located in a voltage grid with a first voltage level provided by the inverter and a second voltage level provided by the second inverter that are at the same voltage level as the power line.

16. The power supply device of claim 1, wherein a factor $K_{Pdroop}$ reacts differently to a positive and negative values of active power P differently, as indicated by the formula:

$$K_{Pdroop} = \begin{cases} K_{PdroopP}\left[\frac{Hz}{kW}\right]; \text{ for } P_{av} > 0 \\ K_{PdroopN}\left[\frac{Hz}{kW}\right]; \text{ for } P_{av} < 0 \end{cases}.$$

17. The power supply system according to claim 9, wherein a factor $K_{Pdroop}$ reacts differently to a positive and negative values of a moving average over a single time period of active power, as indicated by the formula:

$$K_{Pdroop} = \begin{cases} K_{PdroopP}\left[\frac{Hz}{kW}\right]; \text{ for } P_{av} > 0 \\ K_{PdroopN}\left[\frac{Hz}{kW}\right]; \text{ for } P_{av} < 0 \end{cases}.$$

18. The power supply device of claim 1, wherein, based on determination of reverse-flow current, adapting the phase of the supplied AC voltage is implemented using a proportional integral (PI) controller using the following equations:

$\varphi_{cor}[k]=X_R[k]+K_{PI}P_{av}[k]$; and i $X_R[k+1]=X_R[k]+K_{PI}P_{av}[k]$, wherein $X_R$ represents a reactance of the power supply device at a time k,
wherein $K_{PI}$ represents a factor based on the PI controller at the time k, and
wherein $P_{av}[k]$ is a moving average of the supplied AC voltage over one time period at the time k.

19. The power supply device of claim 18, wherein based on determining that a moving average of the supplied AC voltage over one time period is greater than zero, adapting the phase of the supplied AC voltage is implemented using a proportional integral (PI) controller using the following equation:

$\varphi_{cor}[k]=X_R[k]$.

* * * * *